United States Patent [19]

Walker

[11] Patent Number: 4,610,213
[45] Date of Patent: Sep. 9, 1986

[54] PRESSURE SENSING ON RIGID SAILS

[75] Inventor: John G. Walker, Hamble, United Kingdom

[73] Assignee: Young & Thompson, Arlington, Va.

[21] Appl. No.: 599,611

[22] PCT Filed: Aug. 18, 1983

[86] PCT No.: PCT/GB83/00205
§ 371 Date: Apr. 6, 1984
§ 102(e) Date: Apr. 6, 1984

[87] PCT Pub. No.: WO84/00732
PCT Pub. Date: Mar. 1, 1984

[30] Foreign Application Priority Data

Aug. 18, 1982 [GB] United Kingdom ............... 8223762

[51] Int. Cl.$^4$ ..................... B63H 9/06; B64C 13/16
[52] U.S. Cl. ..................... 114/102; 244/203; 244/210; 244/1 R; 340/966
[58] Field of Search ............ 114/102, 103, 39.1, 114/275, 277, 278; 244/198, 203, 90 B, 1 R; 73/180; 340/966, 967, 968

[56] References Cited

U.S. PATENT DOCUMENTS

| 2,237,306 | 4/1941 | Hood | 244/1 R |
|---|---|---|---|
| 2,440,198 | 4/1948 | Green | 73/147 |
| 2,523,481 | 9/1950 | Rabenhorst | 73/147 |
| 2,635,152 | 4/1953 | Dyche, Jr. | 244/1 R |
| 3,006,187 | 10/1961 | Wilkenson | 73/180 |
| 3,304,778 | 2/1967 | Stuart | 73/189 |
| 3,654,807 | 4/1972 | Deskey | 73/180 |
| 4,027,533 | 6/1977 | Pretto | 73/180 |
| 4,350,314 | 9/1982 | Hoadley | 244/1 R |

FOREIGN PATENT DOCUMENTS

| 0044724 | 1/1982 | European Pat. Off. |  |
|---|---|---|---|
| 2416454 | 8/1979 | France . |  |
| 1049352 | 10/1983 | U.S.S.R. | 44/103 |

Primary Examiner—Trygve M. Blix
Assistant Examiner—Rodney Corl
Attorney, Agent, or Firm—Young & Thompson

[57] ABSTRACT

Pressure tapping for rigid sails, the tappings (10, 11, 12, 15, 16) being located to either provide a stall warning or to enable tuning of the sailset to the desired operating angles. A particular flow-state sensitive stall warning device is also described.

12 Claims, 6 Drawing Figures

PRESSURE SENSING ON RIGID SAILS

This invention relates to rigid sails and in particular to monitoring wind pressure and/or flow conditions in the vicinity of such sails.

The type of sailset to which this invention is applicable generally comprises one or more rigid aerofoils, each of which is constructed in the form of a wing (as of an aircraft) although the fabric from which it is made may be different to the fabric of aircraft wings. Usually the cross-section of the aerofoil will be symmetrical but asymmetric cross-sections are not excluded. The aerofoils are mounted to rotate about upright axes which may pass through the aerofoil or be remote from it and connected for example by a boom. Trimming of the sailset is achieved by rotating one or more of the aerofoils about its axis. Sailsets of this type are described in the published European Patent Applications 61291 and 77205.

During sailing there is a constant need to select the angle of attack for the aerofoils that gives the required thrust, which may be a varying percentage of the maximum available thrust, and to protect the sailset and vessel from the excessive forces of high winds. Additionally it may be desired to incorporate specialised systems that modulate the trimming action, for example to maintain a constant angle of heel while sailing or, when the vessel is moored, to minimise warp tension, roll, send etc.

In order to provide an automatic or semi automatic system that responds to the prevailing conditions and the input direction and thrust demands, it is desirable to monitor the precise wind and flow conditions in the vicinity of the aerofoil.

Accordingly the invention provides a sailset comprising at least one rigid aerofoil and including at least one pair of pressure tappings arranged to give an indication of the state of airflow in the vicinity of the aerofoil surface.

The invention is now described by way of example with reference to the accompanying drawings in which.

For the avoidance of doubt, the terms lift, drag and thrust have the following relationship. Lift is the crosswind force, drag is the downwind force and thrust is the vector sum of lift and drag.

Referring to FIG. 1, an aerofoil sailset is represented in sectional view. The sailset consists of a leading sail element 1 that will generally be pivoted about an upright axis passing through the aerofoil, and a trailing sail element 2 that will generally be pivoted about an upright axis that is carried by the leading sail element 1 and passes through the leading sail element towards its trailing edge. The trailing element 2 is attached to its axis by booms which permit the trailing element to be swung from one side of the leading element 1 to the other in mirror image configurations. A slat or flap may be attached to the trailing edge of the leading element 1 in order to enhance the aerodynamic slot configuration formed between the two elements. The elements 1 and 2 constitute the principal sail of the sailset and the whole assembly may be rotated by the action of a tail vane (not shown).

Figure 1A:
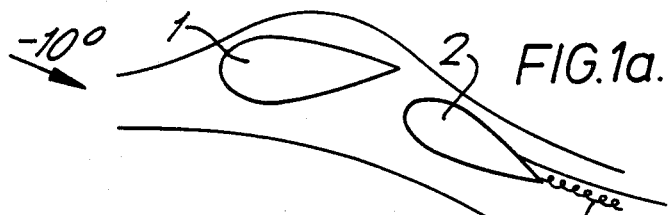
FIGS. 1a–1c illustrate schematically the flow conditions around an aerofoil sailset at the onset of stalling.
Figure 1B:
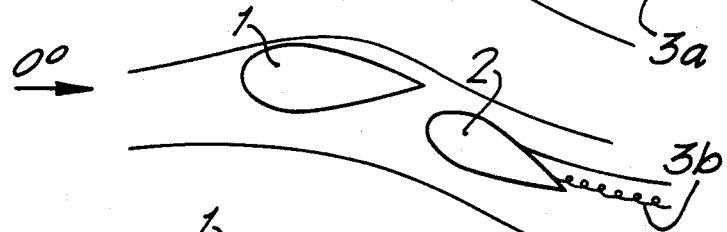
Figure 1C:
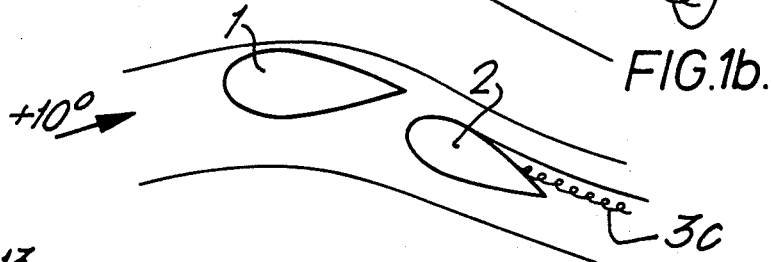

In FIG. 1a the wind, indicated by the arrow, is incident to the leading element 1 at an angle of −10° and the air flow around the aerofoils is smooth and 'attached' with the exception of a small separated wake 3a at the trailing edge of the trailing section 2, on its low pressure side. The presence to a significant degree of this separated wake signals the onset of stalling and as the degree of stalling increases the separated wake moves further along the aerofoil towards the leading edge (i.e. the separation occurs earlier in the airflow) as represented in FIGS. 1b and 1c, respectively, by references 3b and 3c, where the wind is incident at 0° and +10°.

For a single aerofoil the onset of stalling occurs in the same way: at a critical point the airflow becomes separated, first at the trailing edge on the low pressure side and then progressively along the low pressure side towards the leading edge. At the stall a point is reached at which the aerofoil no longer provides useful thrust.

Except for particular circumstances such as running downwind, it is generally the aim to avoid stalling the sailset. For a particular sailset and control system the preferred operating angles of attack depend on the positions of the aerofoils in which maximum lift and maximum lift:drag ratio occur. The lift maxima may occur at positions in which the sailset is close to stalling, and as the wind can shift rapidly, perhaps by 40° per second, and the control system for rotating the aerofoils has a finite response time, the preferred operating positions are chosen to be a safe margin from the stalling positions, for example 4° off the position where the respective maxima occurs.

In the present invention pressure tapping points are located at positions where, by adjusting the angle of attack so that a difference value for the pressure tappings is zero, the sailset is located in the preferred operating position.

Figure 3:
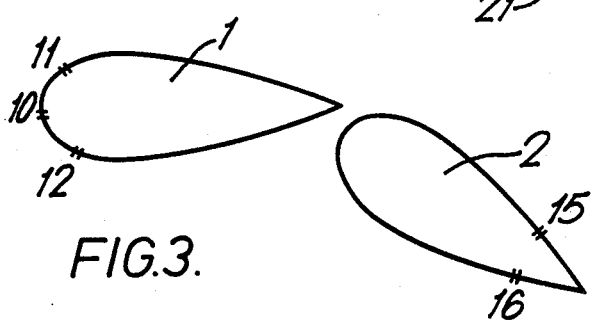
FIG. 3 shows schematically in section, an aerofoil sailset with an alternative arrangement of pressure tapping points in accordance with the invention.

In one embodiment of the invention, with the sailset arrangement as generally illustrated in FIG. 3 pressure tapping points 10, 11 and 12 are provided around the leading edge of the leading section, signals from the three pressure tappings being supplied to a computing means that adjusts the angle of the sailset in accordance with the criteria demanded. For optimum thrust adjustment is made until the following relationship is satisfied $$2P_{10} - P_{11} - P_{12} = 0$$

where
$P_{10}$ is the pressure at tapping 10
$P_{11}$ is the pressure at tapping 11
$P_{12}$ is the pressure at tapping 12

Tapping 10 is located on the centre line of the leading aerofoil element. The positions of tappings 11 and 12 determine the precise angle of incidence of the wind to which the sailset is 'tuned'. It has been determined that a preferred location for tappings 11 and 12 is at a distance of 5% of the total chord around the perimeter from the leading edge and tapping 10. With these pressure tapping locations the above relationship is satisfied when the angle of incidence to the wind is zero.

By placing the tappings closer to the leading edge the relationship is satisfied when the angle of incidence is negative, for example if the tappings are located at a distance around the perimeter of 2½% of the total chord then the angle of incidence for which the relationship is satisfied −1°. This will be further from the stalling position than when the tappings are at the 5% points, and also the tuning is less sensitive as the rate of change of the value of the relationship close to the zero point is lower.

If the tappings are located further away from the leading edge, for example at the 10% points, then the relationship is satisfied by a positive angle of incidence (1½° for the 10% points) and the sailset is operating closer to the stalling position. The problem with tappings at these latter points is that the value of the relationship and hence the sensitivity may suffer due to the pressure versus angle of incidence curves exhibiting a hysteresis between moving into and moving out of the stalled state.

In the event of a deviation of the value of $2P_{10}-P_{11}-P_{12}$ from zero, the control system or computing means will rotate the sailset until the zero value is regained. On a given tack a positive deviation will indicate that rotation in one direction is required, a negative deviation indicating the reverse rotation. The sense of rotation required for a given deviation changes with a change in tack, and therefore the computing means is also supplied with information regarding which tack is being sailed. This could be incorporated by way of a switching system linked to the movement of the trailing aerofoil element or taken from a wind vane, or various other means.

In order to provide optimum lift:drag ratio the relationship that is to be satisfied is $P_{11}-P_{12}=0$. While the tappings at the 5% point a zero is established when the angle of incidence of the wind is −16.5°. When the tack is changed the sign of the difference changes and so, for example, a positive is clockwise, negative is anti-clockwise convention may be adopted. (Positive is clockwise means that tapping 11 is on the starboard side). If a higher lift:drag ratio is desired the tappings may be placed further around the perimeter from the leading edge.

In storm conditions when it is desired to protect the sailset from excessive forces, the trailing section is aligned with the leading section and the sailset is maintained at zero angle of incidence. For this purpose the difference between pressure tappings 11 and 12 is also held at zero.

In all cases the figures given are approximate, and for a given sailset the precise location of the tappings should be determined experimentally, for example by wind tunnel experiments.

Figure 2:
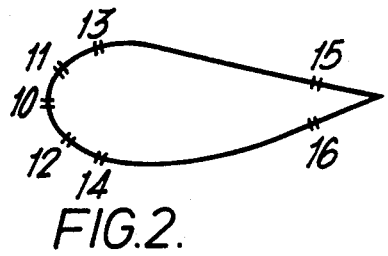
FIG. 2 shows an aerofoil section with pressure tapping points in accordance with the invention.

Referring now to FIG. 2, a single aerofoil section is shown on which the points marked 10, 11, 12, 13, 14, 15 and 16 represent pressure tapping points according to the invention. All the pressure tapping points marked need not be incorporated in every embodiment of the invention, or in some embodiments there may be tappings all along one or both sides of the aerofoil. Symmetrical arrangements of tappings are generally preferred as in most circumstances the aerofoils are symmetrical and it is desired that the sailset function similarly in each of the mirror image configurations, that is function similarly on both port and starboard tack.

As illustrated the tappings are located symmetrically in pairs on opposite sides of the aerofoil, with the exception of a lone tapping on the centre line of the leading edge. Each of the tappings is arranged to give a signal, such as via valves and pressure transducers, to a computing means that then determines the optimum sailing conditions and/or alerts for stalling conditions.

The pressures at the tappings may be compared in either or both of the following ways in order to give an indication of the state of flow.

Firstly the difference between a pair of tappings on the low pressure side of the aerofoil may be monitored. That is the difference between tappings 11 and 13, or between tappings 12 and 14 depending on the tack. When smooth flow exists the pressure difference is small, but at the onset of stall the pressure difference increases as the separated wake has a lower velocity and produces a higher pressure (which leads to reduced lift). When monitoring for stalling conditions in this way the second tapping of the pair (or a further pair) should be placed at the point on the aerofoil at which the extent of the separation of the airflow is tolerable but a warning is desired. Of course by using many pairs of tappings the exact progression of the separated airflow may be ascertained.

Alternatively the pressure difference between tappings on opposite sides of the aerofoil may be monitored. In this instance each one of the pairs 11 and 12, 13 and 14 and 15 and 16 are monitored. When smooth airflow giving thrust exists, there is a pressure difference between the high and low pressure side of the aerofoil. In stalling conditions the pressure on the low pressure side increases due to the separation of the airflow and thus the pressure difference decreases. In the instance of tappings located as in FIG. 2, the pressure difference will fall first between pair 15 and 16, then between pair 13 and 14 and finally between pair 11 and 12. Clearly by putting further pairs between the pair 15 and 16 and the pair 13 and 14 a closer monitoring of the onset of stall would be obtained.

In practice it is not necessary to have pressure tappings all along the aerofoils: a set of three pressure tappings around the leading edge is sufficient for alignment purposes and/or a pair close to the trailing edge as a stall warning system. FIG. 3 illustrates this combination adapted for a sailset with leading and trailing elements, the stall warning tappings being located on the trailing element. Due to the variation in conditions at different heights it is preferable to average the signals (in the computing means) from several sets of tappings spaced apart in the spanwise (upright) direction.

For protection against the ingress of weather the tappings may be closed by an impermeable membrane of low modulus of flexure to transmit pressure signals to the interior so nearly as possible unmodified by the tension in the membrane. To protect against ice local heating or low freezing point spray devices, or other suitable means are included.

A limitation that can occur using a system with, say, three pressure tappings at a given level at or near the leading edge of an aerofoil is that small errors in location of the tappings causes a significant error in the angular adjustment of the aerofoil. Also gradual deterioration of the smoothness and symmetry of the aerofoils due to wear would not be accounted for by the control system which simply relies upon local pressure information.

Figure 4:
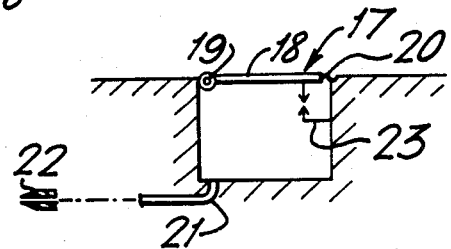
FIG. 4 shows schematically a flow sensing and stall warning device in accordance with the invention.

In order to remove this limitation, in a preferred embodiment of the invention the pressure tappings are modified to provide a device that monitors the flow state for varying wind speeds. Referring to FIG. 4, the device comprises a box 17 recessed in a cavity in the aerofoil structure, the outer surface of the box comprising a flap 18 that is hinged or otherwise pivoted at 19 along the edge closest to the leading edge of the aerofoil. The flap 19 is arranged so that its hinged edge is generally transverse to the direction of airflow along the surface of the aerofoil, and when in the closed position the flap lies flush with the surface of the aerofoil. The edges of the flap 18 are sealed to the sides of the box by a flexible diaphragm 20. The flap is lightly biased, such as by spring loading outwards. The interior of the box is supplied with a pressure representative of the external wind speed by means of a pitot tube 21, the probe end 22 of the tube being mounted at or in front of the leading edge of the aerofoil. Thus the combination of the pitot pressure and the biassing tends to push the flap 18 outwards. When smooth flow over the surface of the aerofoil exists the kinetic energy of that flow prevents the flap from opening and opposes the outward biassing and pitot pressure. In stalling conditions the kinetic energy is small, or even reversed and the pressure is insufficient to prevent the flap from moving outward, to the extent permitted by the diaphragm 20, and separating contact points 23, which initiates a stall warning indicator. (Of course the contacts could be arranged so as to make contact as the flap moves outward).

This device has the advantage that it is triggered by a change in flow state away from smooth high kinetic energy flow, and operates independently of wind speed, as the pitot probe transmits a compensating pressure. Depending on the positions of these devices, they are triggered at various lift:drag ratios, those towards the trailing edge being influenced by the stalling wake before those located closer to the leading edge.

In another embodiment of the invention a pair, or spanwise separated pairs, of pressure tappings located approximately at the maximum diameter of the aerofoil (i.e. the maximum thickness perpendicular to the chord) are monitored for pressure difference $\Delta P$. The lift coefficient $C_L$ is the integral of the pressure coefficients $C_p$ over the whole aerofoil surface.

Pressure on aerofoil = $C_p \times \frac{1}{2}\rho v^2$ where, $C_p$ is the coefficient of pressure, v is the stream velocity, and $\rho$ is the density of fluid $\frac{1}{2}\rho v^2$ is called the kinetic head (which may be measured by a pitot-static assembly).

Thus pressure/$\frac{1}{2}\rho v^2 = C_p$

This relationship gives $C_p$ from two pressure tappings and a pitot-static assembly.

Alternatively an anemometer could be used to calculate the value of the kinetic head, the anemometer yielding an output proportional to the velocity, and $\rho$ is a constant.

Having the capacity to establish $C_p$ at any particular point enables the value of $C_p$ to be plotted for all angles of the sailset. Thus, in a sailset as illustrated in FIG. 3, the sailset may be set to rotate, say at an angular rate $\theta$, thus causing the leading section to rotate and the angle of incidence to change. By monitoring the value of $C_p$, a curve of $C_p$ versus angle of incidence may be plotted for the current prevailing conditions. At the stalling point the rate of increase of $C_p$ with respect to $\theta$ (or other monitored variable related to the angle of incidence) will fall, eventually becoming negative. Having established the current $C_p$ versus $\theta$ curve and established the current $C_p$ maximum the sailset may then be set at the desired operating $C_p$ which will be a safe level $\Delta C_p$ below the maximum $C_p$ value.

Periodically the $C_p$ versus $\theta$ curve will be redrawn and the sailset adjusted accordingly. It is envisaged that the sailset may perform a '$\theta$ sweep' excursion every three to five minutes. Typically it may be expected to find $C_p$ maximum at about $+5°$ to $+10°$, and lift:drag maximum at about $-15°$ to $-20°$.

In all embodiments it may be advantageous to utilise a wind vane upstream of the sailset to provide the control system with approximate values for the angle of incidence, the pressure tappings being used for fine adjustment.

I claim:

1. A sailset comprising a leading rigid upright aerofoil mounted for rotation about an upright axis and a trailing rigid upright aerofoil pivotable about an upright axis to adopt positions cambered with respect to the leading element, a pressure tapping located on the centre line of the leading edge of the leading aerofoil, a pair of pressure tappings located symmetrically on opposite sides of the leading edge of the leading aerofoil and control means for rotating the sailset responsive to a difference in the difference values between the pressure sensed at the central tapping and that at each of the pair of tappings.

2. A sailset according to claim 1 in which the control means rotates the sailset to maintain a zero difference in said difference in the difference value.

3. A sailset according to claim 1 in which the control system is settable to monitor the difference in the pressures at said pair of tappings and to rotate the sailset to maintain a zero difference in those pressures.

4. A sailset according to claim 1 in which the pair of tappings are located at a distance around the leading edge from the centre line of up to 10% of the total chord.

5. A sailset according to claim 4 in which the pair of tappings are located at a distance around the leading edge from the centre line of 5% of the total chord.

6. A sailset according to claim 1 including a plurality of pairs of tappings located symmetrically on opposite sides of the leading edge of the leading aerofoil and the control means is settable to respond to values derived from a selected pair of said plurality of pairs.

7. A sailset according to claim 1 comprising an additional pair of pressure tappings located towards the trailing edge of the trailing section and means for monitoring said additional pair of pressure tappings to provide a stall warning.

8. A sailset according to claim 7 in which said additional pair of pressure tappings are located on opposite sides of the trailing aerofoil.

9. A sailset according to claim 1 further comprising means for sweeping the sailset through a range of angles and monitoring pressure differences between tappings for the swept range of angles.

10. A sailset according to claim 1 comprising a further pair of pressure tappings located at substantially the maximum diameter of the leading aerofoil, and means for sweeping the sailset through a range of angles to plot a value dependent on the pressure difference of said further pair of tappings for the swept range of angles.

11. A sailset comprising a leading rigid upright aerofoil mounted for rotation about an upright axis and a trailing rigid upright aerofoil pivotable about an upright axis to adopt positions cambered with respect to the leading element, at least one pair of pressure tappings located symmetrically on opposite sides of the leading element, control means for rotating the sailset to maintain predetermined difference values between the pressures at the tappings and means for sweeping the sailset through a range of angles to plot a value dependent on the pressure difference of a particular pair of pressure tappings.

12. A sailset according to claim 11 in which said particular pair of pressure tappings are located at the maximum diameter of the leading section.

* * * * *